United States Patent [19]

Ono et al.

[11] Patent Number: 5,564,747
[45] Date of Patent: Oct. 15, 1996

[54] TRIGGER DEVICE

[75] Inventors: Katsuyasu Ono; Kenichi Morizane, both of Kanagawa, Japan

[73] Assignee: NSK, Ltd., Tokyo, Japan

[21] Appl. No.: 408,391

[22] Filed: Mar. 22, 1995

[30] Foreign Application Priority Data

Mar. 22, 1994 [JP] Japan .................................. 6-073774

[51] Int. Cl.$^6$ ........................... B60R 22/46; B60R 21/32
[52] U.S. Cl. .......................... 280/806; 180/282; 102/272; 200/61.45 M
[58] Field of Search ..................... 280/806, 734, 280/735; 180/274, 282; 242/374; 297/480; 200/61.45 M, 61.53, 61.45 R; 102/272, 275.11, 204

[56] References Cited

U.S. PATENT DOCUMENTS

| | | | |
|---|---|---|---|
| 2,436,396 | 2/1948 | McCaslin | 102/272 |
| 3,171,913 | 3/1965 | Kersh | 200/61.45 M |
| 3,879,054 | 4/1975 | Lindblad | 280/806 |
| 4,161,228 | 7/1979 | Svensson et al. | 280/734 |
| 4,596,971 | 6/1986 | Hirabayashi et al. | 335/205 |
| 4,902,036 | 2/1990 | Zander et al. | 280/736 |
| 5,383,388 | 1/1995 | Ono | 280/806 |
| 5,458,369 | 10/1995 | Matsuki et al. | 280/806 |

FOREIGN PATENT DOCUMENTS

| | | | |
|---|---|---|---|
| 0591685 | 4/1994 | European Pat. Off. | 280/734 |
| 2-24242 | 1/1990 | Japan . | |
| 3-96456 | 4/1991 | Japan . | |
| 4-108049 | 4/1992 | Japan . | |
| 2276309 | 9/1994 | United Kingdom | 280/806 |

*Primary Examiner*—Kevin Hurley
*Assistant Examiner*—Peter C. English
*Attorney, Agent, or Firm*—Evenson, McKeown, Edwards & Lenahan

[57] ABSTRACT

Accommodated within a trigger casing are a firing pin arranged movably toward a detonator, an inertia body formed of a permanent magnet and defining along a central axis thereof a through-hole through which the pin extends freely, and a cylindrical permanent magnet having an inner diameter greater than an outer diameter of the body. A ring-shaped non-magnetic weight is also accommodated within the casing in such a way that the weight is arranged on a side opposite to the detonator with the body located between them. When a deceleration or acceleration of at least a predetermined value occurs, the body and the weight together move toward the detonator against magnetic repulsion between the magnet and the body. The inertia body then moves toward the detonator through an opening of a cylindrical permanent magnet under magnetic attraction between the magnet and the body, thereby causing the firing pin to move toward the detonator.

7 Claims, 5 Drawing Sheets

TRIGGER DEVICE

BACKGROUND OF THE INVENTION

1) Field of the Invention

This invention relates to an improvement in a trigger device for actuating a webbing tightener adapted to rotate a take-up spindle of a retractor in a webbing wind-in direction in the event of a collision of a vehicle or an air bag system for protecting an occupant from impact by an air bag promptly inflated with gas in the event of a collision.

2) Description of the Related Art

To protect an occupant in the event of an emergency such as a vehicular collision, passive restraint systems such as a webbing tightener and an air bag system have found widespread utility in recent years.

The webbing tightener comprises, for example, a pulley rotatably mounted on a take-up spindle of a retractor, a cable wound on the pulley, and a piston connected to a free end of the cable and slidably received within a cylinder. Pressure of expanded gas is caused to act on the piston so that a thrust is produced. This thrust then applies a tension to the cable, whereby the cable drives the take-up spindle of the retractor in a webbing winding direction, that is, in a webbing take-up direction. As a consequence, the webbing applied on an occupant is taken up in the event of an emergency. The webbing tightener is therefore provided with a gas generator for supplying gas pressure so that the gas pressure acts on the piston within the cylinder to apply a tension to the cable. This gas generator includes a detonating heater and an explosive. By a signal from a collision sensor, the detonating heater is energized and the resulting heat of the detonating heater detonates the explosive to generate gas.

The air bag system is accommodated, for example, in a steering wheel as a module, which is constructed of a center pad, a folded air bag, an inflator (gas generator), etc. In the event of a vehicular collision, the inflator is ignited to cause immediate combustion. The resulting combustion gas then instantaneously inflates the air bag, whereby the occupant's body is received by the inflated air bag and an impact on the body can be reduced. The air bag system is therefore equipped with a gas generator to supply inflating gas so that the air bag is inflated. According to the gas generator, an igniting charge is fired to ignite a propelling charge. As a result, the propelling charge immediately burns to generate inflating gas.

Gas generators for such webbing tighteners and air bag systems as described above therefore require a trigger device for firing an igniting charge subsequent to detection of a vehicular collision so that the gas generators can be actuated. As these trigger devices, those of the type that a firing heater arranged in an igniting charge is energized responsive to a signal from a collision sensor and the igniting charge is then fired by heat generated from the firing heater have been used commonly, for example, like the firing devices disclosed in Japanese Patent Applications Laid-Open Nos. HEI 2-24242 and 3-96456.

These gas generators however require vehicle body acceleration detection means, such as an acceleration sensor, for sensing a collision or the like of a vehicle to generate a firing signal and a control circuit for determining based on the firing signal whether or not the firing heater should be energized. This has led to the following problems:

1) More parts are needed, and the construction becomes more complex.

2) Wiring for individual electric components must be connected surely to assure the reliability of the system, so that the assembly work is not easy.

3) The system hence becomes expensive.

With a view to overcoming these problems, mechanical trigger devices have hence been developed like the trigger device disclosed in Japanese patent Application Laid-Open No. HEI 4-108049. According to such mechanical trigger devices, movement of a weight which also serves as an acceleration sensor for a vehicle body causes a firing pin to strike an igniter associated with an igniting charge, so that the igniting charge is fired by the resulting impact and such a complex control circuit is no longer needed.

According to the construction of the mechanical trigger device disclosed in Japanese patent Application Laid-Open No. HEI 4-108049, a trigger shaft is caused to rock by movement of a weight as an inertia body so that a stopper portion of the trigger shaft, said stopper portion having been in contact with a flange portion of a firing pin, is disengaged from the flange portion. This allows the firing pin to jut out under force of a compression spring and to strike a propelling charge.

The trigger device in which the firing pin is caused to strike the detonator arranged in association with the igniting charge as described above has however been pointed out to involve some problems. There is the potential problem that the stopper portion of the trigger shaft and the flange portion of the firing pin may rust or may stick together at areas of contact therebetween in the course of a long time. It is also difficult to keep the coefficient of friction stable at the areas of contact therebetween. Any attempt to increase the sensitivity leads to higher possibility of inadvertent actuation, thereby making it difficult to adjust the actuation sensitivity. This results in a system having low flexibility in design choice.

SUMMARY OF THE INVENTION

An object of the present invention is to overcome the above problems and to provide a trigger device which has high flexibility in design choice, is prevented from inadvertent actuation and hence has high reliability, has a simple construction and permits easy assemblage, and is inexpensive.

In one aspect of the present invention, there is thus provided a trigger device for actuating a gas generator with a detonator incorporated therein, comprising:

a firing pin movable toward said detonator so that upon striking said detonator, said detonator is fired;

an inertia body formed of a permanent magnet for supplying kinetic energy to said firing pin and movable toward said detonator, said inertia body having one of N and S poles on one side thereof and the other pole on an opposite side thereof with respect to the direction of movement thereof;

a cylindrical permanent magnet having an inner diameter sufficient to permit passage of said inertia body and arranged between said inertia body and said detonator, said cylindrical permanent magnet having a pole, which is of the same polarity as said one pole, formed on a side closer to said inertia body and another pole, which is of the same polarity as said other pole, formed on a side closer to said detonator; and a weight made of a non-magnetic material and arranged on a side opposite to the detonator (10) relative to the inertia body so that the weight is movable toward the detonator.

According to the above construction of the trigger device of the present invention, the inertia body itself which senses occurrence of an acceleration of at least a predetermined value on said inertia body in a direction toward the detonator can apply impact energy to the detonator so that a trigger shaft which unlocks the moving control of the firing pin responsive to the movement of the inertia body or a biasing member which biases the firing pin toward the detonator is not required.

The energy of impact against the detonator can be increased with the magnitude of an acceleration acting on the inertia body. The exclusion of any member maintained in contact under pressure with the firing pin or the inertia body has eliminated the potential problem that the trigger device may fail to operate due to their rusting or sticking at areas of contact therebetween in the course of a long time, thereby assuring stable operation.

Further, the weight which moves together with the inertia body toward the detonator under an acceleration toward the detonator at the time of a vehicular collision applies its inertial weight to the inertia body only while the inertia body is being exposed to the magnetic repulsion between the inertia body and the cylindrical permanent magnet but, when the inertia body is accelerated toward the detonator under the magnetic attraction between the inertia body and the cylindrical permanent magnet, does not apply its inertial weight to the inertia body. Accordingly, the weight does not reduce the acceleration of the inertia body and the firing pin which are being accelerated toward the detonator under the magnetic attraction between the inertia body and the cylindrical permanent magnet but acts to increase only the inertial weight of the inertia body against the magnetic repulsion between the inertia body and the cylindrical permanent magnet. This has improved the flexibility in design choice and has also made it easier to freely and independently adjust the inertial weight during exposure to the magnetic repulsion, which is a factor determining the sensitivity of actuation, and the inertial weight during exposure to the magnetic attraction, which is a factor determining the reliability of firing of the detonator and the time required until firing.

It is therefore possible to provide a trigger device which has high flexibility in design choice, is prevented from inadvertent actuation and hence has high reliability, has a simple construction and permits easy assemblage, and is inexpensive.

DETAILED DESCRIPTION OF THE INVENTION AND PREFERRED EMBODIMENTS

Based on the accomanying drawings, the first and second embodiments of the present invention will hereafter be described in detail.

Figure 1:
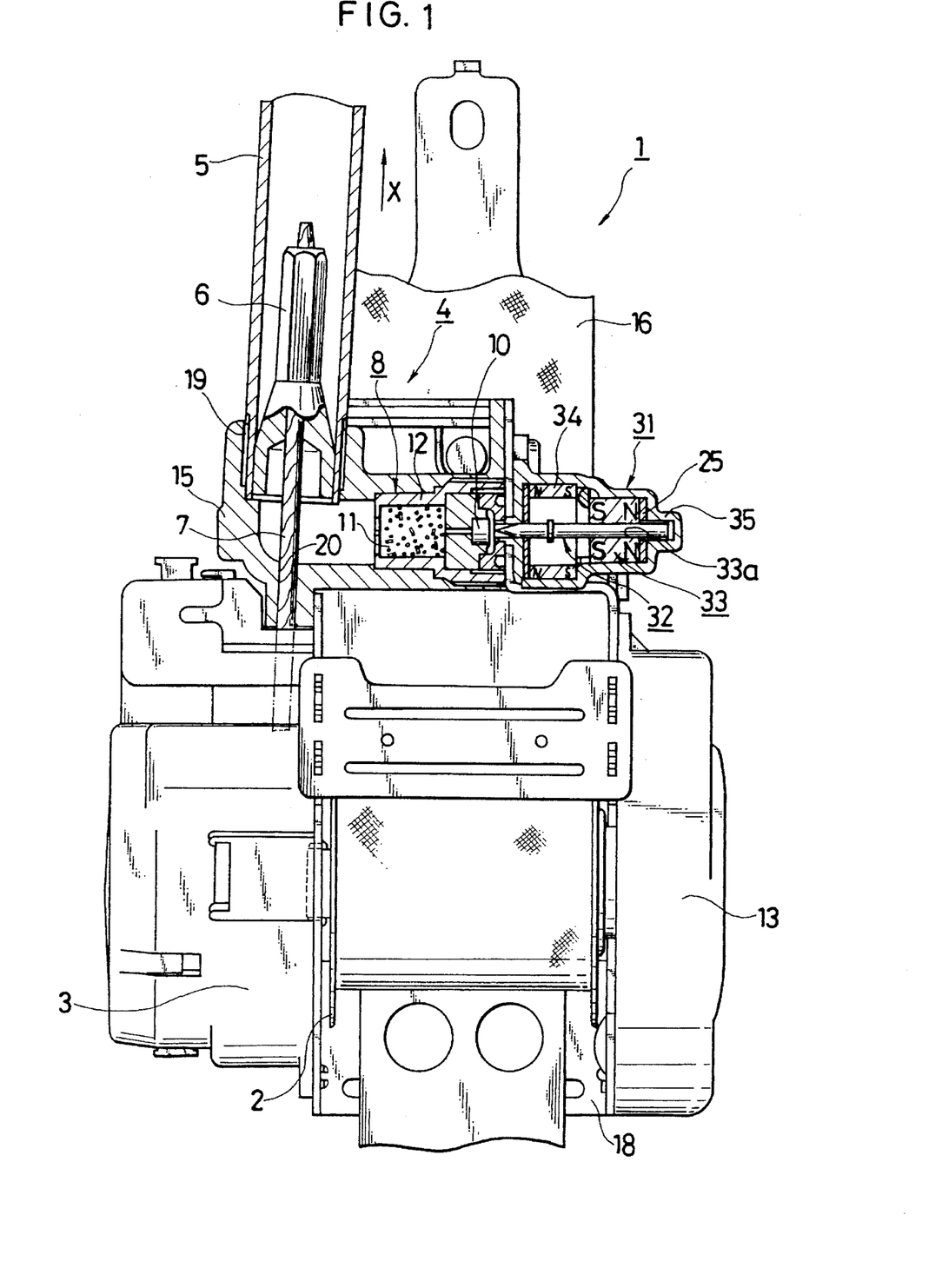
FIG. 1 is a partly cross-sectional, front elevation of a retractor having a pretensioner equipped with a trigger device according to a first embodiment of the present invention.

The pretensioner-equipped retractor 1 according to the first embodiment of the present invention, which is shown in FIG. 1, is provided with a take-up reel 2 which extends between side walls of a retractor base 18 formed in a substantially turned square U shape and carries a webbing 16 wound thereon so that the webbing 16 can be wound in or out as desired. By a take-up spring device connected to a take-up spindle (not shown) of the take-up reel 2, the take-up reel 2 is normally biased in a direction in which the webbing 16 is taken up. In the event of a collision, the take-up spindle is prevented from rotation by a known emergency lock mechanism 13 so that the webbing 16 is prevented from being wound out any further.

On one of the side walls of the retractor base 18, the retractor 1 is provided with a pretensioner 3 which is a webbing tightener for rotating the take-up spindle in a direction to reduce slack of the webbing in the event of a vehicular collision. The pretensioner 3 applies tension to a wire 7 which is wound, for example, as a transmitting member on an unillustrated pulley rotatably mounted on an end portion of the take-up spindle. The wire 7 drives the take-up spindle in the webbing-winding direction so that the webbing 16 applied to an occupant is taken up in the event of an emergency. The pretensioner 3 is provided with drive means 4 for applying tension to the wire 7.

Said drive means 4 comprises a piston 6 connected to one end of the wire 7, a cylinder 5 slidably accommodating the piston 6 therein, a housing 15 communicating and connecting a basal end portion of the cylinder 5 with a gas blow-out portion of a gas generator 8, and the trigger device 31 for actuating the gas generator 8 in response to an acceleration of at least a predetermined value.

The housing 15 is a tubular member bent substantially at a right angle, that is, in a substantially L shape. The basal end portion of the cylinder 5 is fixed in an opening 19 of the housing 15 and the wire 7 connected to the piston 6 extends through a bore 20 formed in opposition to the opening 19.

Figure 2:
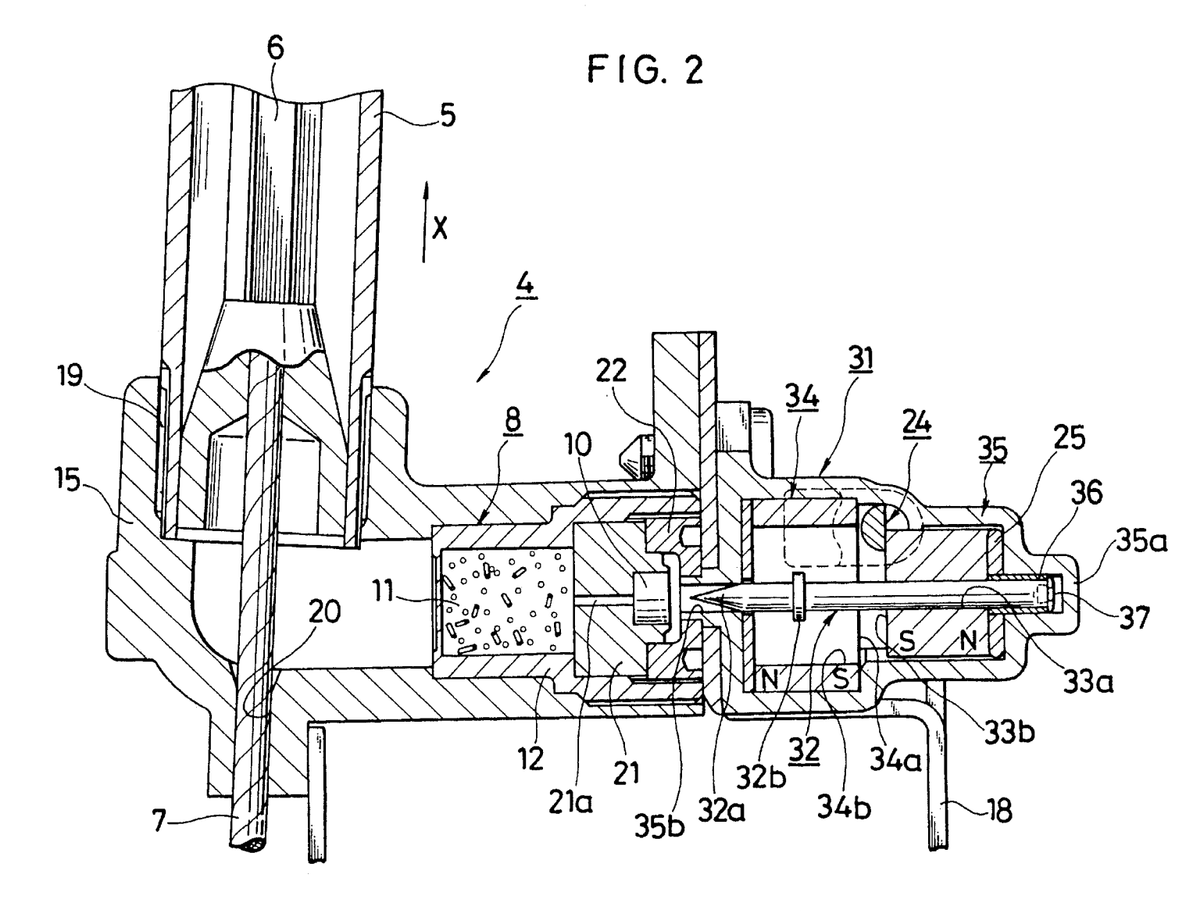
FIG. 2 is an enlarged fragmentary cross-sectional view of the pretensioner-equipped retractor shown in FIG. 1.

The gas generator 8, as also shown in FIG. 2, comprises a casing 12, which encloses an explosive 11 in a gas-generating compartment thereof and is hermetically sealed by a detonator holder 21 made of a metal such as aluminum and carrying a detonator 10 mounted thereon. The detonator holder 21 is fixedly secured by a cap 22. When the detonator 10 is struck and fired, a flame is allowed to penetrate into the gas-generating compartment through a small-diameter channel 21a. The explosive 11 in the gas-generating compartment is then ignited so that expanded gas is blown out through the gas blow-out portion formed at a free end of the casing 12. Further, the trigger device 31 for striking the detonator 10 is arranged at a side of the detonator 10 of the gas generator 8.

The trigger device 31 is constructed of a firing pin 32, an inertia body 33, a cylindrical permanent magnet 34, a weight 25, a trigger casing 35, and an inadvertent actuation preventing means 24. The firing pin 32 is made of a non-magnetic material such as stainless steel, aluminum, copper, titanium, plastics, carbon or the like and is movable toward the detonator 10 (in the leftward direction as viewed in FIG. 1) so that the firing pin 32 can strike and fire the detonator 10. The inertia body 33 is formed of a cylindrical solid permanent magnet defining along a central axis thereof a through-hole 33a through which the firing pin 32 freely extends. The inertia body 33 supplies kinetic energy to the firing pin 32. The cylindrical permanent magnet 34 has an inner wall 34b whose diameter is greater than an outer diameter of the inertia body 33. The weight 25 comprises a ring-shaped non-magnetic member which like the inertia body 33, defines a through-hole with the firing pin 32 freely extending therethrough. The trigger casing 35 accommodates therein the firing pin 32, the inertia body 33, the cylindrical permanent magnet 34 and the weight 25 and is fixedly secured on the retractor base 18. The inadvertent actuation preventing means 24 prevents inadvertent actuation of the trigger device 31.

As is illustrated in FIG. 2, the firing pin 32 has a hammer pin 32a formed at a free end portion thereof to strike the detonator 10 and a flange portion 32b formed as an engaged portion at a basal portion of the hammer pin 32a. A rear end portion of the firing pin 32 is held via a sleeve 36 in a pin holding portion 35a on a side of a rear wall of the trigger casing 35. Here, the sleeve 36 is fitted and held in the pin holding portion 35a slidably in the direction of the central axis of the firing pin 32 which is pointed toward the detonator 10. At a rear end of the firing pin 32, a crimped portion 37 is formed to prevent the firing pin 32 from slipping out of the sleeve 36. The rear end portion of the firing pin 32 is therefore held by the pin holding portion 35a so that the firing pin 32 can move integrally with the sleeve 36 toward the detonator 10.

Further, the hammer pin 32a extends through the through-aperture 35b of a front wall of the trigger casing 35 and is located in opposition to the detonator 10. The flange portion 32b is located in opposition to the front wall of the trigger casing 35 with a space left between the flange portion 32b and the front wall. When the inertia body 33 is caused to move toward the side of the detonator 10 and to strike the flange portion 32b, the firing pin 32 to which kinetic energy has been supplied from the inertia body 33 moves toward the detonator 10 so that the hammer pin 32a strikes and fires the detonator 10.

The inertia body 33 loosely fitted on the firing pin 32 is accommodated on the side of the rear wall portion of the trigger casing 35. An outer peripheral wall of the inertia body 33 is slidably held by a rear-end-side inner peripheral wall of the trigger casing 35 so that the inertia body 33 is movable along a central axis of the trigger casing 35. Magnetic poles of the inertia body 33 are set to have an S pole on the side of the detonator 10 and an N pole on an opposite side. The diameter of the through-hole 33a of the inertia body 33 is smaller than the outer diameter of the sleeve 36 and a front edge of the sleeve 36 is maintained in contact with the rear end face of the inertia body 33, thereby constraining movement of the firing pin 32 toward the detonator 10. The firing pin 32 therefore cannot move by itself toward the detonator 10 unless the inertia body 33 moves toward the detonator 10.

The weight 25, which is freely fitted on the sleeve 36 on a side closer to the rear wall of the trigger casing 35 than the inertia body 33, is a ring-shaped non-magnetic body, which is made of a non-magnetic metal such as lead or zinc, a non-magnetic high-density resin material such as a resin containing zinc oxide or the like, or a resin material such as POM (polyacetal) and is designed to have a desired weight. Further, outer peripheral edges of the weight 25 are rounded as viewed in cross-section to avoid the potential problem that, upon movement of the weight 25 within the trigger casing 35, they would interfere with the inner wall of the trigger casing 35 and would hamper its movement.

When fixed within the trigger casing 35 on the side of the front wall (i.e., on the side of the detonator 10), the cylindrical permanent magnet 34 is arranged coaxially with the inertia body 33. Magnetic poles of the cylindrical permanent magnet 34 are set to have an N pole on the side of the detonator 10 and an S pole on the side of the inertia body 33 so that magnetic poles of the same polarity (i.e., S) are located opposite to each other between the cylindrical permanent magnet 34 and the inertia body 33.

Figure 3:
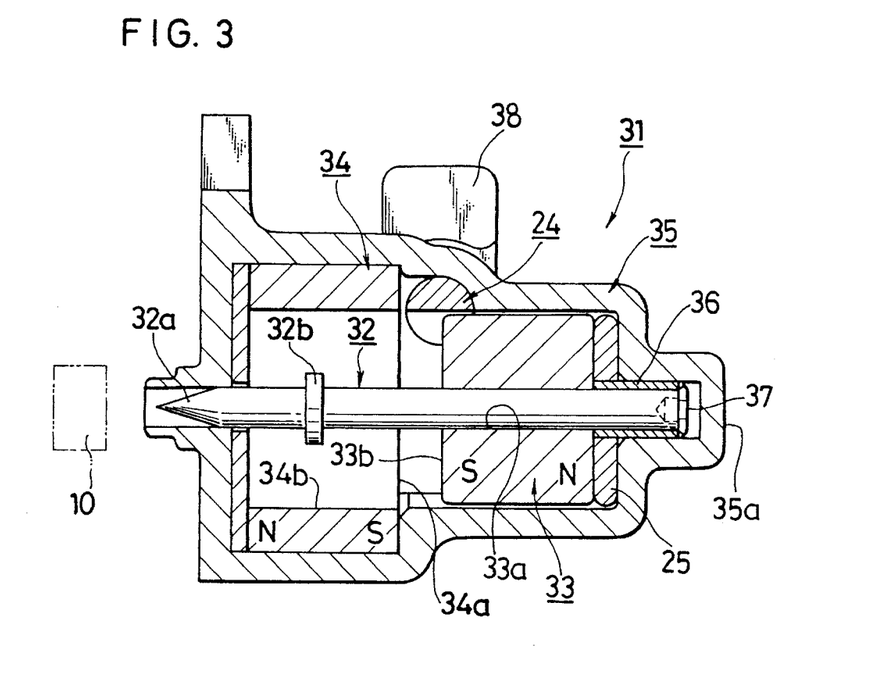
FIG. 3 is a vertical cross-section for illustrating the state of operation of the trigger device shown in FIG. 2.

The inertia body 33—which is arranged in such a way that as shown in FIG. 3, a detonator-side end face 33b is spaced from a rear-wall-portion-side end face 34a of the cylindrical permanent magnet 34 and their adjacent magnetic poles have the same polarity (S pole—S pole in the drawing)—is biased away from the detonator 10, namely, toward the rear wall portion by magnetic repulsion. In other words, the inertia body 33 is axially slidable along the firing pin 32 but unless force of a magnitude greater than the magnetic repulsion acting between the cylindrical permanent magnet 34 and the inertia body 33 acts toward the detonator 10 on the inertia body 33, the inertia body 33 cannot move toward the detonator 10. Further, the weight 25 is kept in the state held between the rear end face of the inertia body 33 and the rear wall of the trigger casing 35, so that the weight 25 cannot by itself move toward the detonator 10 unless the inertia body 33 moves toward the detonator 10. As the firing pin 32 with the sleeve 36 maintained in contact with the inertia body 33 cannot move toward the detonator 10 either unless the inertia body 33 moves towards the detonator 10. The trigger device 31 is therefore not actuated.

Figure 4:
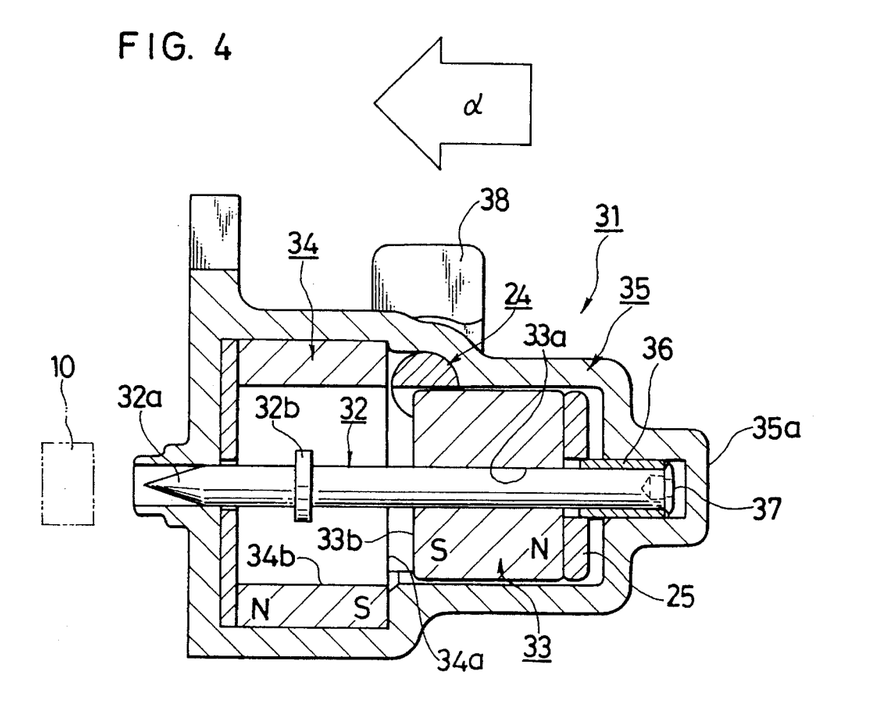
FIG. 4 is a vertical cross-section for illustrating the state of operation of the trigger device shown in FIG. 2.

The trigger device 31 is provided with the inadvertent actuation preventing means 24, which is fitted in a recess formed between the rear-wall-portion-side end face 34a of the cylindrical permanent magnet 34 and the detonator-side end face 33b of the inertia body 33 and across an upper portion of a guide bore of the trigger casing 35 so that the inertia body 33 is selectively brought into a movement-prevented state or a movable state (FIGS. 1 and 2 show the inertia body 33 in the movement-prevented state). Further, a lever member 38 is connected to the inadvertent actuation preventing means 24 to indicate whether or not the inadvertent actuation preventing means 24 has been actuated. The trigger casing 35 and the inadvertent actuation preventing means 24 are desirably made of a non-magnetic material such as stainless steel, aluminum, zinc, plastics,.copper or titanium.

Where the inadvertent actuation preventing means 24 has been released, the inertia body 33 moves together with the weight 25 toward the detonator 10 as shown in FIG. 4 (leftwards as viewed in the drawing) when inertia force of the inertia body 33 and the weight 25, said inertia force being the product of the total inertia mass of the weight of the inertia body 33 and the weight of the weight 25 and their acceleration $\alpha$ toward the detonator 10, becomes greater than the magnetic repulsion between the inertia body 33 and the cylindrical permanent magnet 34. Namely, while the inertia body 33 is exposed to the magnetic repulsion between the inertial body 33 and the cylindrical permanent magnet 34, the weight 25 not exposed to the magnetic repulsion is allowed to move substantially in a form integral with the inertia body 33 so that the weight 25 pushes the inertia body 33 leftwards. Since the inertial weight of the weight 25 toward the detonator 10 acts on the inertia body 33, the inertia body 33 can still move toward the detonator 10 while being pushed by the weight 25 even in the case of such a low acceleration that, because the weight of the inertia body 33 is light, no inertial force sufficient to overcome the magnetic repulsion between the cylindrical permanent magnet 34 and the inertia body 33 is produced.

Figure 5:
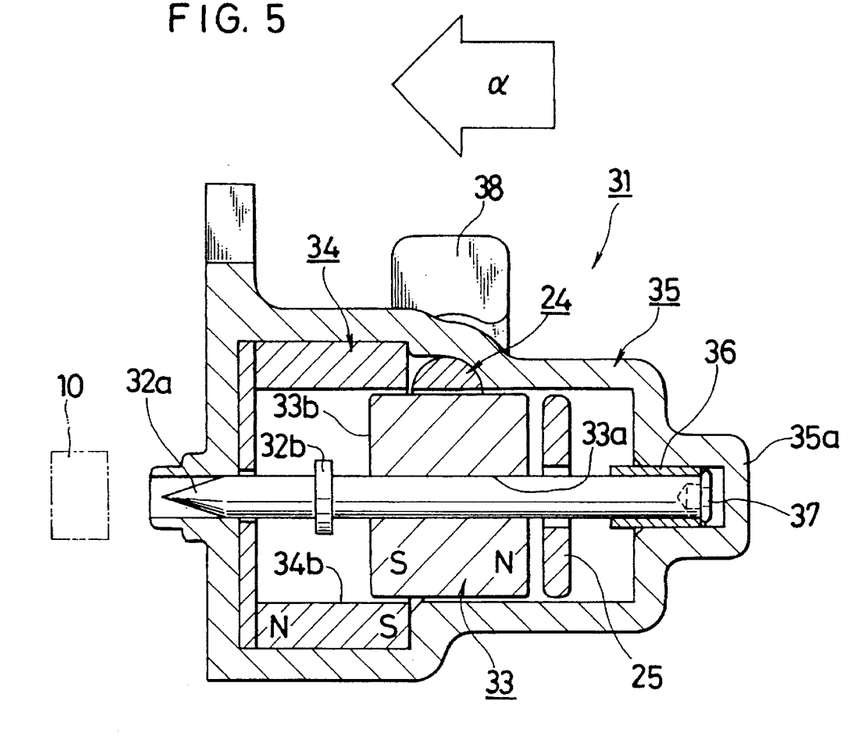
FIG. 5 is a vertical cross-section for illustrating the state of operation of the trigger device shown in FIG. 2.

When the inertia body 33 moves to a region where magnetic attraction acts on the inertia body 33, the inertia body 33 is accelerated toward the detonator 10 by the magnetic attraction. Since the magnetic attraction does not act on the weight 25 of the non-magnetic material which has pushed the inertia body 33 by the inertial force only, the weight 25 cannot move integrally with the inertia body 33 and is hence separated from the inertia body 33 as illustrated in FIG. 5. Namely, the inertial weight of the weight 25 does not act on the inertia body 33 upon acceleration of the inertia body 33 toward the detonator 10 under the magnetic attraction between the inertia body 33 and the cylindrical permanent magnet 34. The weight 25 therefore does not reduce the acceleration of the inertia body 33 which is being accelerated toward the detonator 10 under the magnetic attraction between the inertia body 33 and the cylindrical permanent magnet 34.

Figure 6:
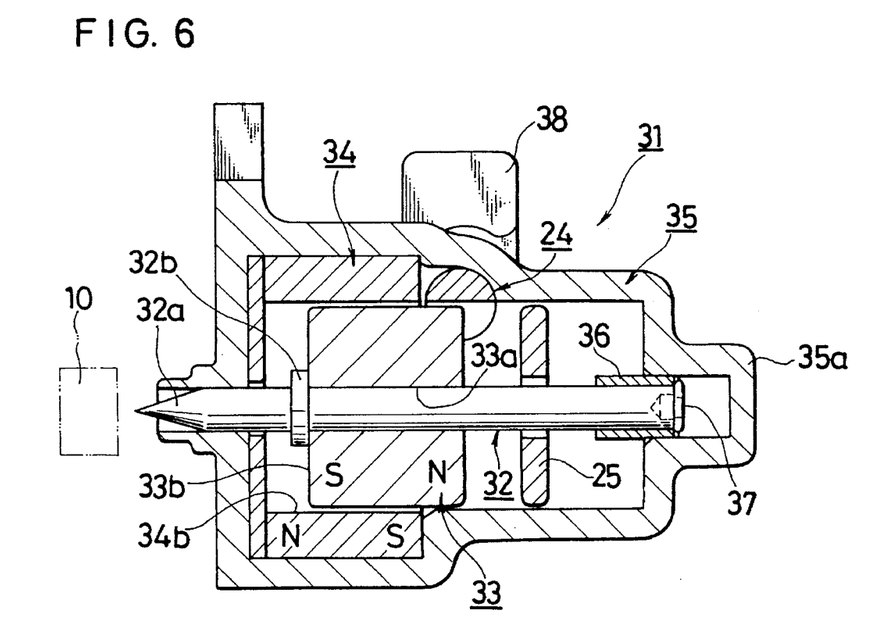
FIG. 6 is a vertical cross-section for illustrating the state of operation of the trigger device shown in FIG. 2.

The inertia body 33 accelerated toward the detonator 10 enters the opening of the cylindrical permanent magnet 34 and collides against the flange portion 32b, as illustrated in FIG. 6. As has been described above, the inertia body 33 has the function as an acceleration sensor while making use of the change of the magnetic force from the repulsion to the attraction and also the function as trigger means to initiate the supply of impact energy to the firing pin 32. In general, the firing pin 32 itself has also started moving under the acceleration directed toward the detonator so that the inertia body 33 and the flange portion 32b are not necessarily brought into contact with each other at the position shown in the same drawing.

Figure 7:
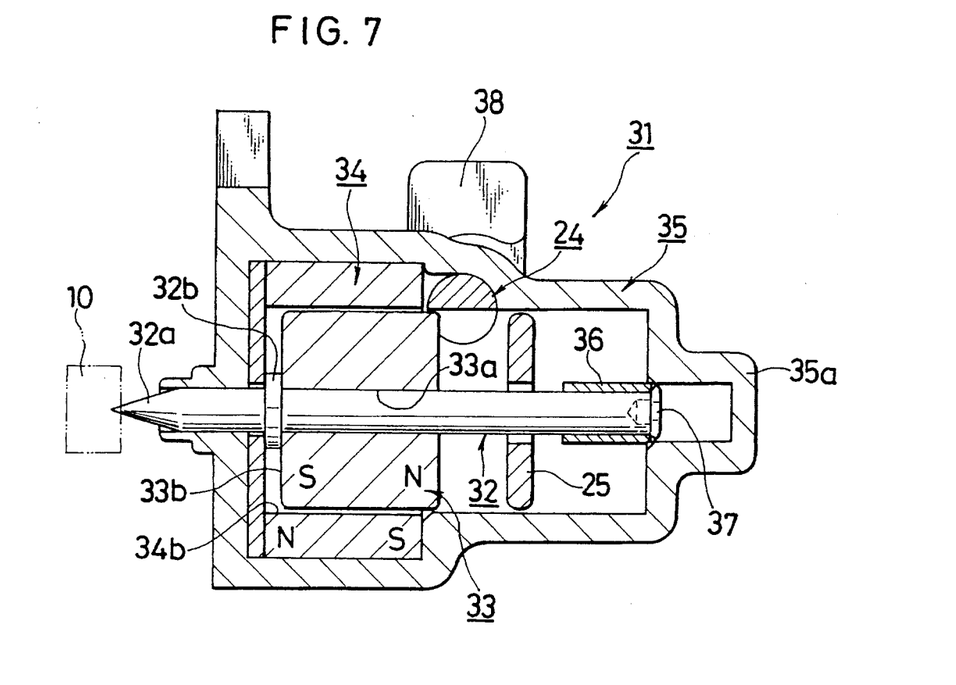
FIG. 7 is a vertical cross-section for illustrating the state of operation of the trigger device shown in FIG. 2.

Further, the inertia body 33 accelerated toward the detonator 10 under magnetic attraction then moves the firing pin 32 toward the detonator 10 as shown in FIG. 7, whereby the hammer pin 32a strikes and fires the detonator 10. In general, it is designed that the detonator 10 is fired before the flange portion 32b of the firing pin 32 is brought into contact with the front wall portion of the trigger casing 35.

Since the inertia body 33 which senses an acceleration of a vehicle body directly applies impact energy to the detonator 10, the trigger device 31 is simple in construction and easier in assemblage and at the same time, can increase the impact energy to the detonator 10 in accordance with the magnitude of an acceleration acting on the inertia body 33. Further, there is no member maintained in contact under pressure with the firing pin 32 or the inertia body 33. The trigger device 31 is therefore free of the potential problem that they may rust or stick together at areas of contact therebetween in the course of a long time and the trigger device 31 may fail to actuate, thereby assuring stable operation.

In addition, the weight 25 does not reduce the acceleration of the inertia body 33 and the firing pin 32 which are being accelerated toward the detonator under the magnetic attraction between the inertia body 33 and the cylindrical permanent magnet 34, but the weight 25 acts to increase only the substantial inertial weight of the inertia body 33 against the magnetic repulsion between the inertia body 33 and the cylindrical permanent magnet 34. The acceleration upon causing the firing pin 32 to collide against the detonator 10 is therefore not reduced by an increase in inertial weight upon acceleration toward the detonator under the magnetic attraction between the cylindrical permanent magnet 34 and the inertia body 33 or by a reduction in the magnetic attraction as in the case that the inertial weight of the inertia body 33 is simply increased or the magnetic repulsion is weakened to increase the sensitivity of the operation.

The trigger device 31 according to this embodiment enjoys improved flexibility in design choice, and facilitates independent free adjustment of the practical inertial weight of the inertia body 33, said inertial weight being the factor for determining the sensitivity of actuation, while the inertia body 33 is exposed to magnetic repulsion and also of the inertial weight of the inertia body 33 while the inertia body 33 is exposed to magnetic attraction as a factor for determining the reliability of firing of the detonator and the time required until firing. Even when it is required as a condition, for example, to maintain the attraction within a predetermined range, it is possible to optimize the sensitivity of operation by either increasing or decreasing the weight of the weight 25. The flexibility in setting the operation sensitivity is therefore high. It is also possible to easily meet such a demand that the sensitivity of operation is changed depending on the vehicle to which the trigger device of this embodiment is to be mounted.

A description will next be made of operation of the retractor 1 equipped with the pretensioner 3.

While a vehicle is running in a normal state, the pretensioner 3 is out of engagement with the take-up spindle so that the take-up spindle is rotatable freely. The webbing 16 can therefore be wound in under the biasing force of a winding spring and at the same time, wound out against the spring force.

When a deceleration of a certain value occurs on the vehicle due to sudden braking, the emergency lock mechanism 13 of the retractor 1 is actuated to lock rotation of the take-up spindle. As a result, the webbing is prevented from being wound out. Moreover, the inertia force acting on the inertia body 33 and the weight 25 is smaller than the magnetic repulsion acting between the cylindrical permanent magnet 34 and the inertia body 33 and the trigger device 31 is not actuated. The drive means 4 for the pretensioner 3 therefore is not actuated.

When an extremely large predetermined deceleration occurs as in the case of a vehicular collision or the like, the inertia force acting on the inertia body 33 and the weight 25 becomes greater than the magnetic repulsion acting between the cylindrical permanent magnet 34 and the inertia body 33 so that the inertia body 33 moves toward the detonator and strikes the flange portion 32b. As a consequence, the firing pin 32 strikes the detonator 10 and fires the same. By this firing of the detonator 10, the gas generator 8 within the drive means 4 is ignited. When combustion gas flows from the gas generator 8 into the cylinder 5, the piston 6 is promptly moved upwards (in the direction indicated by arrow X) by the pressure of the gas so produced. The wire 7 is quickly pulled in the direction indicated by arrow X by the drive force of the piston 6, the take-up spindle is driven in the webbing-winding direction. As a result, the webbing 16 applied on an occupant is wound in so that slack of the webbing is eliminated.

Therefore, neither vehicle body acceleration detection means, such as an acceleration sensor, for detecting a collision or the like of a vehicle and generating a firing signal nor a control circuit for determining on the basis of the firing signal whether or not the firing heater should be energized is needed. The structure is hence simplified and no wiring is needed to connect such means. The retractor 1 equipped with the pretensioner can achieve a substantial reduction in the manufacturing cost while assuring high reliability.

It is to be noted that each of the members making up the trigger device according to the present invention is not limited to the shapes in the above embodiments and can of course take various shapes on the basis of the subject matter of the present invention. For example, the weight in the present invention, said weight being arranged on the side opposite to the detonator with the inertia body interposed between the weight and the detonator and being arranged movably toward the detonator, is not limited to a ring-like non-magnetic member like the weight 25 in the above-described embodiment and needless to say, can take various shapes. In the above embodiment, the description has been made of the trigger device combined with the drive means making use of the wire. The trigger device according to the present invention can also be applied to drive means of the type that uses no wire.

Figure 8:
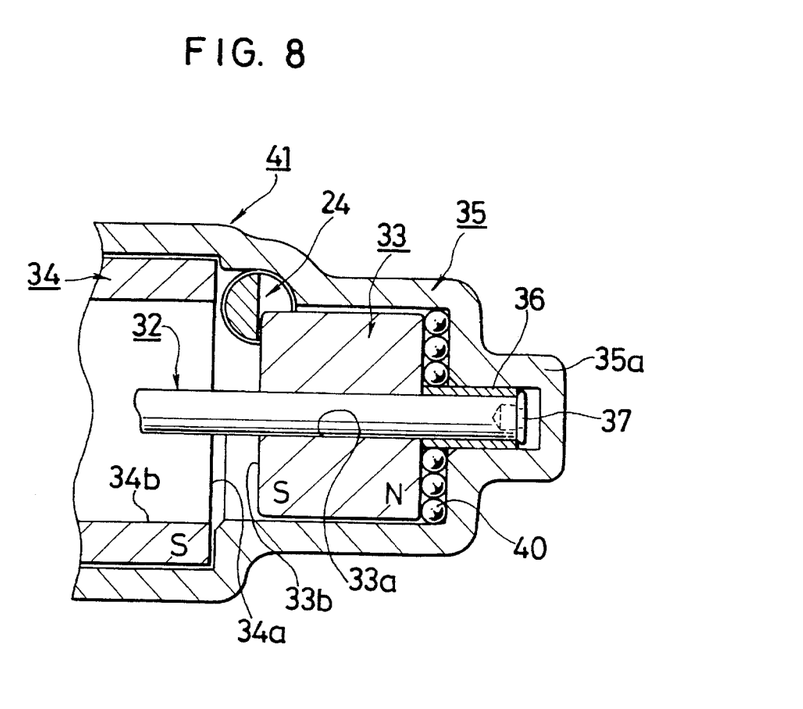
FIG. 8 is a fragmentary vertical cross-section of a trigger device according to a second embodiment of the present invention.

In the trigger device 41 according to the second embodiment of the present invention as shown in FIG. 8, a weight which is arranged on a side opposite to the detonator 10 with the inertia body 33 interposed therebetween and is movable toward the detonator is formed of plural spherical bodies 40. These spherical bodies 40 are held between the rear end face of the inertia body 33 and the rear wall of the trigger casing 35 and are maintained in a state arranged in the form of a ring. These spherical bodies 40 comprise non-magnetic members made of a non-magnetic metal such as lead or zinc or a non-magnetic high-density resin material containing zinc oxide or the like.

No particular limitation is imposed on the polarities of the magnetic poles in the inertia body 33 and the cylindrical permanent magnet 34 as long as the magnetic poles of the same polarity are located opposite to each other and produce repulsion in the normal state that the inertia body 33 is apart from the cylindrical permanent magnet 34. The positions of the magnetic poles in the inertia body 33 and the cylindrical permanent magnet 34 can be set opposite to those in the above-described embodiments.

In the embodiments described above, the trigger devices according to the present invention are each applied as a trigger device for actuating the gas generator for the webbing tightener. Their application is however not limited to such trigger devices. They can each be applied to a trigger device for actuating a gas generator of an air bag assembly.

What is claimed is:

1. A trigger device for actuating a gas generator with a detonator incorporated therein, comprising:

a firing pin movable toward said detonator so that upon striking said detonator, said detonator is fired;

an inertia body formed of a permanent magnet for supplying kinetic energy to said firing pin and movable toward said detonator, said inertia body having one of N and S poles on one side thereof and the other pole on an opposite side thereof with respect to the direction of movement thereof;

said firing pin having a portion which is engageable by said inertia body, said inertia body being disposed such that when it moves toward said detonator it engages said portion and thereby supplies kinetic energy to said firing pin;

a cylindrical permanent magnet having an inner diameter sufficient to permit passage of said inertia body and arranged between said inertia body and said detonator, said cylindrical permanent magnet having a pole, which is of the same polarity as said one pole, formed on a side closer to said inertia body and another pole, which is of the same polarity as said other pole, formed on a side closer to said detonator; and a weight made of a non-magnetic material and arranged as a member discrete from said firing pin on a side opposite to the detonator relative to the inertia body so that the weight is freely movable toward the detonator.

2. A trigger device according to claim 1, wherein said weight is a ring-shaped member externally loose fitted on said firing pin.

3. A trigger device according to claim 1, wherein said inertia body is externally loose fitted on said firing pin and said firing pin is provided on a side of said detonator with an engaged portion engageable with said inertia body.

4. A trigger device according to claim 3, wherein said firing pin is provided with a contact member which is normally in contact with an end face of said inertia body, said end face being on a side opposite to said detonator.

5. A trigger device according to claim 1, further comprising a casing made of a non-magnetic material and holding therein said firing pin, said inertia body and said cylindrical permanent magnet.

6. A trigger device according to claim 6, further comprising an inadvertent actuation preventing means movable between a first position, where said inadvertent actuation preventing means is supported on said casing and is located within the path of movement of said inertia body to interfere with said inertia body, and a second position where said inadvertent actuation preventing means is located out of the path of movement of said inertia body.

7. A trigger device for actuating a gas generator with a detonator incorporated therein, comprising:

a firing pin movable toward said detonator so that upon striking said detonator, said detonator is fired;

an inertia body formed of a permanent magnet for supplying kinetic energy to said firing pin and movable toward said detonator, said inertia body having one of N and S poles on one side thereof and the other pole on an opposite side thereof with respect to the direction of movement thereof;

said firing pin having a portion which is engageable by said inertia body, said inertia body being disposed such that when it moves toward said detonator it engages said portion and thereby supplies kinetic energy to said firing pin;

a cylindrical permanent magnet having an inner diameter sufficient to permit passage of said inertia body and arranged between said inertia body and said detonator, said cylindrical permanent magnet having a pole, which is of the same polarity as said one pole, formed on a side closer to said inertia body and another pole, which is of the same polarity as said other pole, formed on a side closer to said detonator;

a weight made of a non-magnetic material and arranged on a side opposite to the detonator relative to the inertia body so that the weight is movable toward the detonator; and wherein said weight consists of a plurality of spherical bodies arranged around said firing pin.

* * * * *